(12) United States Patent
Bao et al.

(10) Patent No.: US 6,985,235 B2
(45) Date of Patent: Jan. 10, 2006

(54) CASCADED FIBER FABRY-PEROT FILTERS

(75) Inventors: Yufei Bao, Roswell, GA (US); Ion Dimitriu, Atlanta, GA (US); Kevin Hsu, Roswell, GA (US); Calvin M. Miller, deceased, late of Naples, FL (US); by Jeffrey W. Miller, legal representative, Kennesaw, GA (US)

(73) Assignee: Micron Optics, Inc., Atlanta, GA (US)

( * ) Notice: Subject to any disclaimer, the term of this patent is extended or adjusted under 35 U.S.C. 154(b) by 310 days.

(21) Appl. No.: 10/233,011

(22) Filed: Aug. 30, 2002

(65) Prior Publication Data

US 2003/0076505 A1 Apr. 24, 2003

Related U.S. Application Data

(60) Provisional application No. 60/316,567, filed on Aug. 30, 2001.

(51) Int. Cl.
*G01B 9/02* (2006.01)

(52) U.S. Cl. .................................... 356/480
(58) Field of Classification Search ............... 356/480; 385/12; 359/577, 578, 579
See application file for complete search history.

(56) References Cited

U.S. PATENT DOCUMENTS

| | | | |
|---|---|---|---|
| 4,848,999 A | 7/1989 | Taylor | 65/4.3 |
| 4,892,388 A | 1/1990 | Taylor | 350/320 |
| 4,923,273 A | 5/1990 | Taylor | 350/96.21 |
| 5,146,527 A | 9/1992 | Mallinson | 385/98 |
| 5,212,745 A | 5/1993 | Miller | 385/25 |
| 5,212,746 A | 5/1993 | Miller et al. | 385/25 |
| 5,237,630 A | 8/1993 | Hogg et al. | 385/12 |
| 5,289,552 A | 2/1994 | Miller et al. | 385/73 |
| 5,375,181 A | 12/1994 | Miller | 385/27 |
| 5,422,970 A | 6/1995 | Miller et al. | 385/72 |
| 5,425,039 A | 6/1995 | Hsu et al. | 372/6 |
| 5,509,093 A | 4/1996 | Miller et al. | 385/27 |
| 5,563,973 A | 10/1996 | Miller et al. | 385/81 |
| 5,838,437 A | 11/1998 | Miller et al. | 356/345 |
| 5,892,582 A | 4/1999 | Bao et al. | 356/345 |
| 6,044,189 A | 3/2000 | Miller | 385/37 |
| 6,115,122 A | 9/2000 | Bao et al. | 356/345 |
| 6,137,812 A | 10/2000 | Hsu et al. | 372/6 |
| 6,241,397 B1 | 6/2001 | Bao et al. | 385/73 |

OTHER PUBLICATIONS

Gehrsitz, S. et al. (Aug. 1997), "Tandem triple-pass Fabry-Perot interferometer for applications in the near infrared," Appl. Opt.(36):5355-5361.

(Continued)

*Primary Examiner*—Samuel A. Turner
(74) *Attorney, Agent, or Firm*—Greenlee, Winner and Sullivan, P.C.

(57) ABSTRACT

The invention relates to Fabry-Perot interferometers (FFPI) comprising two or more optically coupled tunable all-fiber Fabry-Perot component filters, wherein the Fabry-Perot cavity of the filter is formed within a bare section of optical fiber held within a fiber ferrule. The wavelength transmitted by the interferometer can be tuned thermally or electromechanically for a fiber containing the Fabry-Perot cavity bonded into a groove of a metal substrate. The interferometer can be tuned by changing the length of Fabry-Perot cavity, including by the use of a piezoelectric transducer.

20 Claims, 4 Drawing Sheets

OTHER PUBLICATIONS

Humblet, P.A. and Hamdy, W.M. (Aug. 1990), "Crosstalk analysis and filter optimization of single- and double-cavity Fabry-Perot filters," IEEE J. on Selected Areas in Communications 8(6):1095-1107.

Ja, Y.H. (Sep. 1995) "Optical vernier filter with fiber grating Fabry-Perot resonators," Appl. Opt. 34(27):6164-6167.

Kaminow, I.P. et al. (1989), "A Tunable Vernier Fiber Fabry-Perot Filter for FDM Demultiplexing and Detection," IEEE Photonics Technol. Lett. 1(1):24-26.

Lindsay, S. M. et al. (1981) "Construction and alignment of a high performance multipass vernier tandem Fabry-Perot interferometer," Rev. Sci. Instrum. 52(10):1478-1486.

Lemieux J-F. et al, (May 1999), "Step-tunable (100 GHz) hybrid laser based on Vernier effect between Fabry-Perot cavity and sampled fibre Bragg grating," Electron. Lett. 35(11):904-906.

Lemieux, J.-F. et al. (Jul. 1999), "100 GHz frequency step-tunable hybrid laser based on a vernier effect between a Fabry-Perot cavity and a sampled fiber Bragg grating." OSA Trends in Optics and Photonics. Advanced Semiconductor Lasers and their Applications, vol. 31, from the Topical Meeting Editor(s): Hollberg, L. and Lang, R.J., Optical Soc. America, Washington, DC, USA, pp. 186-188.

Miller, C.M. and Miller, J.W. (1992), "Wavelength-Locked, Two-Stage Fibre Fabry-Perot Filter for Dense Wavelength Division Demultiplexing in Erbium-Doped Fibre Amplifier Spectrum," Electron, Lett. 28(3):216-217.

Oretga, B. et al. (Jul. 1999), "Wavelength Division Multiplexing All-Fiber Hybrid Devices Based on Fabry-Perot's and Gratings," J. Lightwave Technol. 17(7):1242-1247.

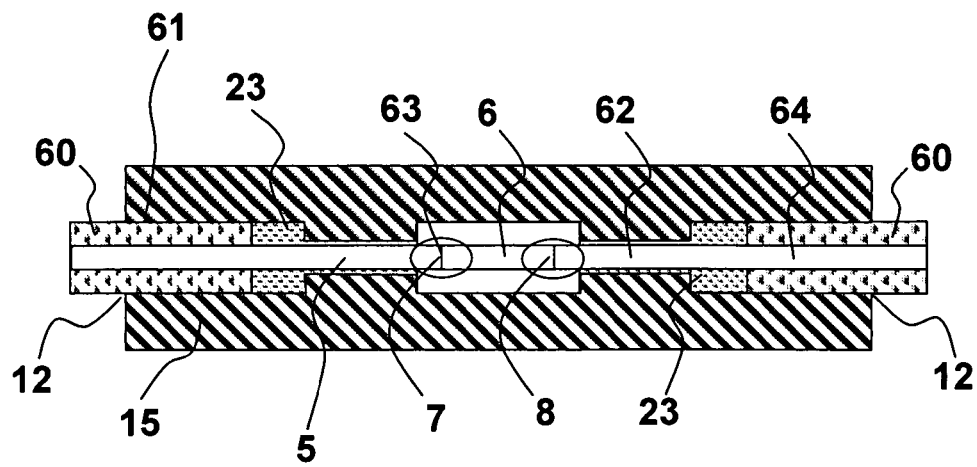
FIG. 4
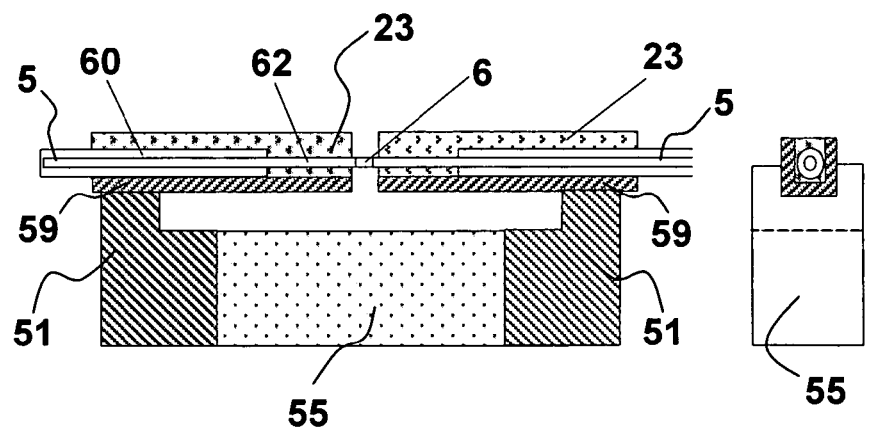
FIG. 5A  FIG. 5B

CASCADED FIBER FABRY-PEROT FILTERS

CROSS-REFERENCE TO RELATED APPLICATIONS

This application claims priority under 35 U.S.C. 119.(e) to U.S. provisional application Ser. No. 60/316,567, filed Aug. 30, 2001, which is incorporated by reference in its entirety herein.

BACKGROUND OF THE INVENTION

This invention relates to tunable, all-fiber optical filters containing Fabry-Perot cavities formed in bare fiber, and that are thermally or electromechanically tunable. The invention is also directed to tunable filters comprising two or more of these tunable all-fiber Fabry-Perot filters (FFP component filters) which are optically coupled to achieve desirable properties.

Multiple-stage filters combining component filters of selected FSR to provide a vernier configuration are known in the art. See, for example, Oretag, B. et al. (July 1999) J. Lightwave Technology 17(7):1242–1244; Humblet, P. A.; Hamdy, W. M. (August, 1990) "Crosstalk analysis and filter optimization of single and double-cavity Fabry-Perot filters" IEEE Journal on Selected Areas in Communications 8(6): 1095–1107; Lemieux, J.-F et al. (2000) "100 GHz frequency step-tunable hybrid laser based on a vernier effect between a Fabry-Perot cavity and a sampled fiber Bragg grating." OSA Trends in Optics and Photonics. Advanced Semiconductor Lasers and their Applications Vol. 31, from the Topical Meeting (July 1999) p: 186–188 Editor(s): Hollberg, L. and Lang, R. J. Optical Soc. America, Washington, D.C., USA; Lemieux J-F. et al, (May 1999) "Step-tunable (100 GHz) hybrid laser based on Vernier effect between Fabry-Perot cavity and sampled fibre Bragg grating" Electronics Letters 35(11):904–906; Gehrsitz, S. et al. (August 1997) "Tandem triple-pass Fabry-Perot interferometer for applications in the near infrared" Applied Optics(36):5355–61; Ja, Y. H. (September 1995) "Optical vernier filter with fiber grating Fabry-Perot resonators" Applied Optics 3(7):6164–617; Kaminow, I. P et al. (1989) "A tunable Vernier fiber Fabry-Perot filter for FDM demultiplexing and detection" IEEE Photonics Technology Letters 1(1):24–26; Lindsay, S. M. et al. (1981) "Construction and alignment of a high performance multipass vernier tandem Fabry-Perot interferometer" Review of Scientific Instruments 52(10): 1478–1486 and references cited therein.

SUMMARY OF THE INVENTION

This invention provides tunable cascaded optical filters comprising two or more all-fiber Fabry-Perot filters which are optically coupled. The filters are thermally or mechanically tunable. Preferably the filters are tunable by fiber compression.

In a specific embodiment, two or more filters of this invention are optically coupled in series to form a cascaded filter and the FSRs of the component filters are selected to generate a vernier configuration in the cascaded filter. The FSRs of the component filters are all selected to be a portion of the tuning range of interest (TR). None of the component filters have the same FSR and no two filters have FSRs that are multiples of each other. The invention provides tunable cascaded filters having two, three, four or more component filters.

In preferred embodiments, the all-fiber Fabry-Perot filters that are components of the cascaded filters herein are formed by bonding or fusing bare (i.e., uncoated) fibers to form Fabry-Perot interferometers as described in the examples herein. The Fabry-Perot interferometers formed in this way can be tuned, by changing the length of the Fabry-Perot cavity, thermally, e.g., by selectively changing the temperature of a substrate to which an interferometer is bonded, or mechanically, e.g. electromechanically, by changing the length of a piezoelectric element which in turn changes the length of the fiber Fabry-Perot cavity. Fabry-Perot interferometers formed by bonding or fusing of bare optical fibers provide significant advantage. They are low cost, retain high mirror reflectivity so that high finesse, e.g., Finesse>100, can be achieved. High reflection contrast and reflection contrast that is insensitive (or much less sensitive) to polarization is achievable in these interferometers. Further, where thermal tuning is applied, the interferometers have low thermal mass which facilitates fast thermal tuning. In addition for application to the cascaded filters of this invention, the use of two or more low cost thermally tuned all-fiber Fabry-Perot interferometers facilitates construction of low cost filters with multiple stage cascading.

In addition, this invention provides fixed and tunable Fabry-Perot interferometers constructed as described herein by bonding or fusing of bare fibers. The invention further provides methods for making these Fabry-Perot interferometers by bonding or fusing of bare fibers. In specific examples, Fabry-Perot interferometers of this invention are tunable by thermal compression of the cavity or by electromechanical compression of the cavity using piezoelectric transducers.

BRIEF DESCRIPTION OF THE DRAWINGS

FIG. 4 illustrates another view of a thermally tunable FFPI.

FIGS. 5A and 5B illustrate an electromechanically tunable FFPI.

DETAILED DESCRIPTION OF THE INVENTION

Figure 1:
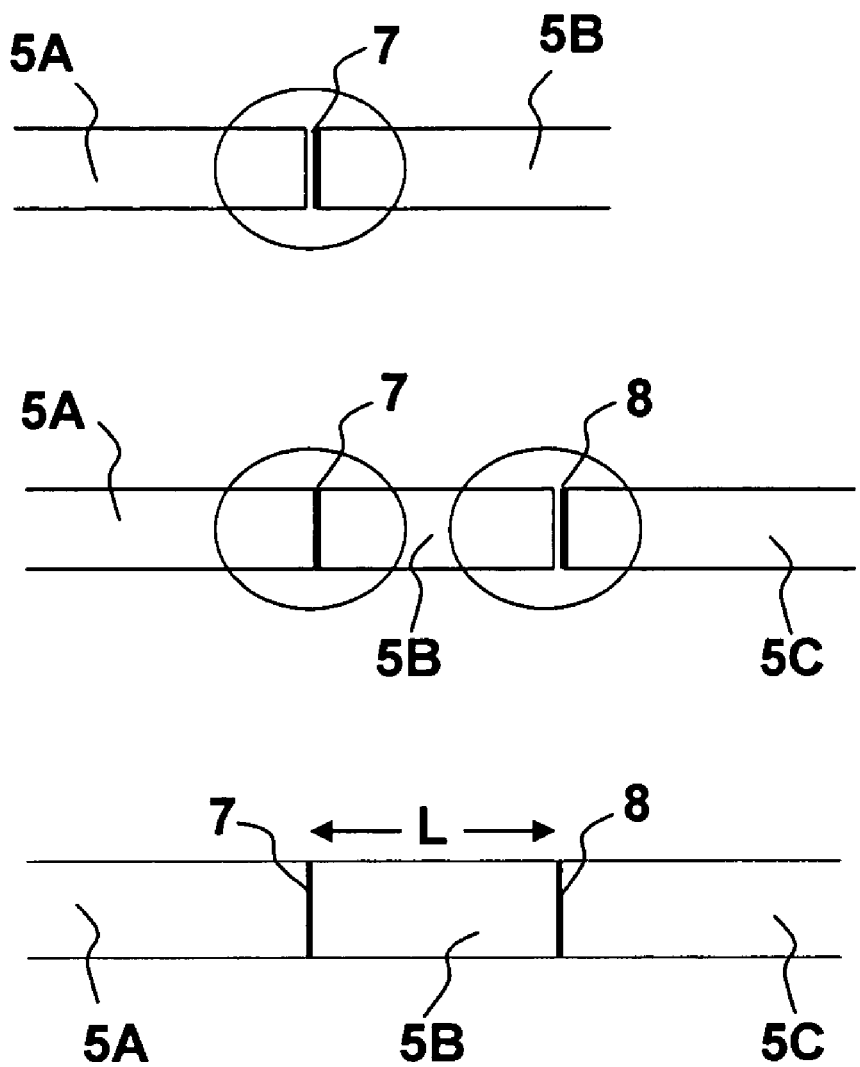
FIG. 1 illustrates formation of a bare fiber Fabry-Perot interferometer (FFPI) by bonding or fusing of fibers.

Coordinated tuning of the component filters in a vernier configuration provides tuning over a selected wide tuning range of interest. Appropriate selection of the FSR of the component filters, as is understood in the art, provides a cascaded filter with a desired wide tuning range. Low finesse component FFP filters when combined in such vernier configurations and coordinately tuned provide tunable filters that have significantly higher finesse than the finesse of the individual component filters. The component Fabry-Perot filters of this serially cascaded filter are selected to have multiple orders in the tuning range of interest (TR) which do not overlap in that range to provide a vernier configuration. Transmission through the serially cascaded component FFP filters only occurs at peak overlap points and the contrast factor of the cascaded filter is a maximum of the sum of the individual filters. In the case in which all of the component filters have approximately the same bandwidth $BW_1$, the cascaded filter bandwidth is $(2^{1/N}-1)^{1/2} BW_1$ where N is the number of stages of the filter. While the BW of the component filters of the cascaded filters need not be the same, configurations in which all of the component filters have about the same BW are preferred to facilitate vernier configuration design.

The vernier configuration is generated by selecting the FSR of the component filters of the cascade to all be less than TR, the tuning range of interest, by some factor (i.e., each component filter is selected to have an FSR that is a portion of the entire TR, e.g, ½ TR, ⅞ TR, 90% TR, 4% TR, etc.) A set of vernier multipliers ($V_N$, one for each filter stage) is selected and used to calculate the FSR's of the component filters. For example, for a two stage cascaded filter containing two tunable component FFP filters vernier multipliers of ⅛ and ⅐ could be employed. The FSRs of the component filters would them be ⅛ TR and ⅐ TR. In a vernier filter configuration, none of the component filters of the cascade have the same FSR and none of the component filters have an FSR that is a multiple of the FSR of any other component filter (i.e., no two vernier multipliers are the same and no two vernier multipliers are multiples of each other.) For example, in a two stage filter, multipliers of ½ and ¼ or multipliers of ⅛ and 1/16 would not filter characteristics With FSR of the component filters selected in this way, the multiple orders of the component filters will not overlap in TR.

For example, for TR from about 1530 nm to about 1570 nm (about 40 nm or about 5000 GHz), a cascade of two component Fabry-Perot filters one with FSR of ⅛TR (i.e., 625 GHz) and the second with FSR of ⅐TR (i.e., 714.3 GHz) can be combined to generate a cascaded filter of this invention. If the bandwidth of both component filters are about equal ($BW_1$) then the cascaded filter will have a $BW_C$ of $(2^{1/N}-1)^{1/2}$, as noted above. More specifically, for a TR of 5000 GHz using the vernier multipliers ⅛ and ⅐ for a two-stage filter, FSR of the first component filter is calculated to be ⅛TR or 625 GHz and the FSR of the second FSR is calculated to be 714.3 GHZ.

Useful vernier multipliers are the reciprocals of a series of consecutive integers (that are not multiples of each other), e.g., the series 1/11, 1/12, 1/13 or the series 1/17, 1/18, 1/19. Vernier multiples need not be the reciprocal of an integer and can also be expressed as percentages, e.g., the series 75%, 76% and 77% can be employed to design a vernier filter of this invention.

Once the FSR of the component filters are selected using a series of vernier multipliers, the FP cavity lengths needed to achieve the desired FSR of the component filters can be calculated (where $L=c/2nFSR$).

Because component filters with small FSRs can be used in the filter designs of this invention, the component filters can also have low finesse, yet achieve high resolution in a cascaded filter. Similarly, wide FSRs in the cascaded filters can be achieved using component filters with narrow FSR.

The number of stages needed in a given cascaded filter depends upon the desired wavelength discrimination, the spacing between the FSR of the component filters and the BW of the component filters. The closer the spacing between the FSR relative to the BW of the component filters, the lower the attenuation of unselected wavelengths and the more preferred it is to add an additional stage to the filter. For example, in a vernier configuration with vernier multipliers of 1/10 and 1/11 for a TR of 5000 GHz, FSR1 is 1/10×5000=500 GHz and 1/11×5000=455 giving a spacing between FSR of about 45 GHz. For component filters having BW=5–6 GHz, the FSR spacing is approximately 5×BW. In this case, the attenuation of undesired peaks is expected to be sufficient so that a third or higher filter stage is not needed.

In contrast, in a vernier configuration with vernier multipliers of 1/20 and 1/21 for a TR of 5000 GHz, FSR1 is 1/20×5000=250 GHz and FSR2 1/21×5000=238 GHz giving an FSR difference of about 12 GHz. For component filters having BW=5–6 GHz, the FSR difference in this case is only about 2.4×BW. In this second case, it is unlikely that sufficient attenuation would be provided without the addition of a third stage. In general, when a two-stage filter is designed with multipliers that are sufficiently small (about 1/20 or less) such that the difference in FSR between the first two filter stages is small (less than about 3×BW of the component filters), a third stage is required to provide sufficient attenuation between the orders in the cascaded filter.

The term coordinated tuning is intended to encompass tuning of one or more of the component filters of the vernier cascaded filters of this invention to achieve transmission (or reflection) of desired wavelengths (or transmission of a spectrum containing notches at a selected wavelengths) within the filter tuning range (TR).

Tuning of a component FFP filter is achieved by changing the length (L) of the Fabry-Perot cavity. For the preferred cascaded filters of this invention temperature tuning is a preferred method. In a specific embodiment, the cavity length is changed by adjusting the temperature of a metal carrier or substrate to which the fiber carrying the Fabry-Perot cavity is bonded. While any method for controlling the temperature of the fiber carrying the FP cavity can be employed, a preferred method is the use of thermal electric heater/cooler. The heater/cooler device is preferably combined with a thermostat control that allows automated temperature control of the component filter to a selected temperature. The temperature control device (heater/cooler, thermostat and appropriate power and control electronics) also preferably allows for manual adjustment of temperature. Tuning of the cascaded filter includes simultaneous tuning by temperature adjustment of one, two, three or more (if present) of the component filters or sequential tuning by temperature adjustment of one, two, three or more (if present) of the component filters. Tuning also includes, setting the temperature of one or more (but less than all) of the component filters and adjusting the temperature(s) of the remaining component filters to achieve desired wavelength transmission (a peak or a notch) or reflection.

Temperature tuning of the component filters of the cascaded filters of this invention can be automated using computer control which may include the use of a look-up table(s) of temperature calibration data (e.g., wavelength transmitted at a selected temperature) for the component filters. Individual component filters can be recalibrated for temperature dependence of filter resonance wavelength as needed to update look-up table data. The temperature of one or more of the individual component filters can be manually adjusted so that the cascaded filter transmits a selected wavelength.

Component filters of this invention can be tuned electromechanically by changing the length of a piezoelectric transducer which in turn changes the length of a fiber cavity in a fiber bonded directly or indirectly to the piezoelectric transducer.

Cascaded filters of this invention can be employed in any optical application for which their optical characteristics and tuning capabilities are suited. They are of particularly application in the field of optical communications in the wavelength range of about 1500- about 1600 nm for receipt or transmission of optical signals. Particular applications are in wavelength add/drop devices and in MUX/DEMUX devices. In general, the filters of this invention are useful in any wavelength or spectrum analyzer.

In specific embodiments, the cascaded filters of this invention comprise two or more all-fiber Fabry-Perot (FP) filters in which FP cavities are introduced into optical fiber using fiber fusion or fiber splicing techniques that are known in the art. The term "all-fiber" refers to FFP (Fiber Fabry-Perot) cavities formed within composite optically continuous optical fibers by the introduction of FP cavities, i.e., by introduction of two or more mirrors, reflective taps, or other reflective surfaces, between sections of fiber. All-fiber FFPs do not include FP cavities formed external to the fiber that are optically coupled into optical fiber employing lenses.

All-fiber component FFPs of this invention are constructed, for example, as illustrated in FIG. 1 as follows:

(1) mirrors (7) and (8) are deposited on fiber ends after suitable fiber end preparation;

(2) a fiber with deposited mirror (5B) is aligned with and bonded to the end of another fiber (5A) (with no mirror) to form an embedded mirror 7 retaining suitable reflection within aligned optically continuous fiber (bonding can be done, e.g., by fusion splicing or epoxy bonding);

(3) fiber (5B) extending from the embedded mirror is shortened by accurate cleaving or polishing to the desired cavity length to obtain L for proper FSR; and (4) a second fiber (5C) with a deposited mirror (8) at a fiber end is aligned with and bonded (at the mirror end) to the cleaved or polished fiber end of step 3 to form a second embedded mirror (8) and thereby form an FP cavity of selected length L.

In an alternative construction procedure, fiber ends are aligned and fused. Low loss fiber splices between fiber ends can be prepared following techniques described in U.S. Pat. No. 5,146,527 (Mallinson). Reflective taps or reflectors can be introduced into a continuous length of optical fiber to form FP cavities as described in U.S. Pat. Nos. 4,923,273, 4,892,388 and 4,848,999 (Taylor). Reflectors can be located at fiber slice joints employing the method of U.S. Pat. No. 5,237,630.

The above-listed steps are analogous to the steps employed to construct FP cavities in fiber ferrule assemblies as described, for example, in U.S. Pat. Nos. 5,289,552; 5,212,745; 5,212,746; 5,375,181; 5,425,039; 6,137,812; 5,422,970; 5,509,093; 5,563,973; 6,044,189; 2,248,386; 5,838,437; 5,892,582; 6,115,122; 6,241,397, except that the fibers that are bonded need not be confined within ferrules. Cascaded filters in vernier configuration can be constructed using fixed or tunable cavity FFPs formed within ferrule assemblies. Ferrule assembly can provide very low loss FFPs of very high finesse. The component FFP filters of the cascaded filters herein can be relatively low finesse filters. The high finesse and increased fabrication cost of FFPs in ferrule assemblies are not required for application in the cascaded filters of this invention. Fiber bonded or fiber spliced FFPs (without ferrules) as described above are preferred for use in temperature tuned component FP filters of this invention.

The FFPs formed by the listed numbered steps above by fiber fusion, splicing or epoxy bonding are nominally fixed cavity length FFPs. However, the cavity length of the FFP can be lengthened or shortened by heating or cooling, respectively, the fibers. The change in temperature required to tune the filter over an FSR depends upon the temperature coefficient of the FFP. To facilitate temperature tuning, the fiber construct containing the bonded (spliced or fused) FFPs is in turn bonded to a substrate. In this case, the change in temperature required to tune the FFP over an FSR depends upon the composite temperature coefficient of the FFP bonded (e.g., using heat-curable epoxy) to the substrate (fiber, bonding agent and substrate all contributing to the composite temperature coefficient).

Figure 2:
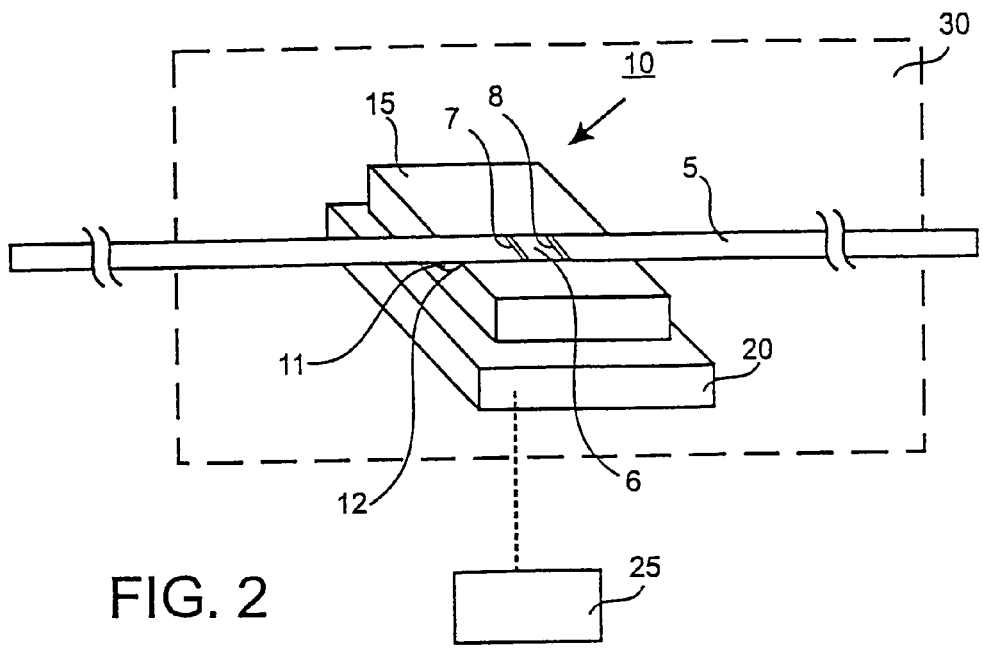
FIG. 2 illustrates a thermally tunable FFPI having a thermoelectric heater/cooler.

In a specific embodiment, illustrated in FIG. 2, the fiber (5) containing the FFP cavity (6) is bonded using heat-cured epoxy into a groove or channel formed in a substrate (15) and sized for receiving the fiber. In a preferred embodiment, the fiber containing the FFP is bonded into a groove or channel formed in a metal substrate, such as an aluminum block or other metal (ceramic or other material) having a high temperature expansion coefficient comparable (preferably within about +/−10% of) to that of aluminum.

To facilitate temperature tuning it is desirable for the composite temperature coefficient of the FFP to be in the range of 30–50 ppm/C.° and more preferably within the range 35–49 ppm/C°. A value in this range can be achieved by packaging the filter in a high thermal coefficient substrate, such as aluminum. The fiber is preferably bonded into a shaped groove in the substrate using heat curable epoxy. When an aluminum substrate and heat-cured epoxy are used, the aluminum expands during epoxy cure and when cooled to room temperature, the bonded fiber is under compressive load. As the temperature is changed to tune the filter, the amount of compressive load is changed and the filter tunes without any tensile load on the filter.

Alternatively, the bonded FFP formed by the steps listed above can be bonded to a piezoelectric transducer (PZT) as described for bonding to the substrate in the temperature tuned embodiment, e.g., by epoxy bonding (although no groove will typically be present on the PZT). Application of suitable voltage to the PZT compresses the FFP to tune it.

An exemplary two-stage filter of this invention with resolution band width of about 3 GHz which is suitable for 2.5 Gbits/sec sub-carriers is made as follows:

Calculate $BW_1$ of the component filters (for calculation assume that component filters have the same BW): $BW^1 = (2^{1/2}-1)^{1/2} BW = 3/0.643 = 4.75$ GHz. Select component filters to have BW of about 4.5 to about 5.0 GHz to have BW of the cascaded filter in the range of about 2.9 to about 3.3 GHz;

Select vernier multipliers for use in filter. For a two-stage filter the multipliers will generally be larger than 1/20. For illustration vernier multipliers of 1/11 and 1/12 are employed. For a tuning range of 1530 nm to 1565 nm (C-band), FSR1 is 1/11(4,382 GHz)=398 GHz and FSR2 is 1/12(4,382 GHz)=365 GHz;

Calculate cavity length for correct FSR using equation; L=c/2nFSR. The cavity length required for the first component filter is 257.3 microns and for the second component filter is 280.5 microns;

Calculate the required finesse ($\Im$=FSR/BW) to give 84 for the first filter and 77 for the second filter;

Estimate the temperature needed to tune across one FSR. Assuming a composite temperature coefficient of 32 ppm/° C. One FSR tuning requires a cavity length change of about 0.3875 microns which will require an estimated temperature change of +/− about 47° C. Max $\Delta T = [+/-0.3875/32 * 257] \times 10^6$);

Estimate the temperature accuracy needed to tune to a given channel. Assuming that the accuracy needed to guarantee locking to the correct channel is about 0.3 GHz out of 398 GHz, a temperature accuracy of +/−0.04° C. is estimated to be needed;

Fabricate the cascaded filter by optically coupling in series:
- a first component filter having FSR of 398 GHz, cavity length of about 257 microns and BW of 4.5 to 5 GHZ which will have a finesse of about 84 and
- a second component filter having FSR of 365 GHz, cavity length of about 280 microns and BW of 4.5 to 5 GHz which will have a finesse of about 77 and providing for temperature tuning over a range of at least about 50° C. with a temperature control accuracy of at least about +/−0.04° C.

An exemplary three-stage filter of this invention with resolution bandwidth of about 3 GHz which is suitable for 2.5 Gbits/sec sub-carriers is made as follows:

Calculate $BW_1$ of the component filters (for calculation assume that component filters have the same BW): $BW^1 = (2^{1/2}−1)^{1/2} BW = 3/0.5098 = 5.9$ GHz. Select component filters to have BW of about 5.6 to about 6.2 GHz to have BW of the cascaded filter in the range of about 2.85 to about 3.2 GHz;

Select vernier multipliers for use in filter. For illustration vernier multipliers of 1/17, 1/18 and 1/19 are employed. For a tuning range of 1530 nm to 1565 nm (C-band), FSR1 is 1/17(4,382 GHz) 258 GHz, FSR2 is 1/18(4,382 GHz)=244 GHz and FSR3 is 1/19 (4,382 GHz)=231 GHz;

Calculate cavity length for correct FSR using equation; L=c/2nFSR. The cavity length required for the first component filter is 396 microns, for the second component filter is 420 microns and for the third component filter is 443 microns;

Calculate the required finesse ($\Im$=FSR/BW) giving 44 for the first filter, 41 for the second and 39 for the third filter;

Estimate the temperature needed to tune across one FSR. Assuming a composite temperature coefficient of 32 ppm/° C. One FSR tuning requires a cavity length change of about 0.3875 microns that will require an estimated temperature change of +/− about 31° C. Max ΔT=[+/−0.3875/32*396] ×10⁶;

Estimate the temperature accuracy needed to tune to a given channel. Assuming that the accuracy needed to guarantee locking to the correct channel is about 1 GHz out of 258 GHz, a temperature accuracy of +/−0.12° C. is estimated to be needed;

Fabricate the cascaded filter by optically coupling in series:
- a first component filter having FSR of 258 GHz, a cavity length of about 396 microns and BW of 5.6 to 6.2 GHz which will have a finesse of about 44;
- a second component filter having FSR of 244 GHz, cavity length of about 420 microns and BW of 5.6 to 6.2 GHz which will have a finesse of about 41 and
- a third component filter having FSR of 231 GHz, cavity length of about 443 microns and BW of 5.6 to 6.2 GHz which will have a finesse of about 39 and providing for temperature tuning over a range of at least about 35° C. with a temperature control accuracy of at least about +/−0.12° C.

The use of lower vernier multipliers than those illustrated in the examples above requires filters with smaller FSRs, larger cavity lengths, lower finesse, a narrower temperature change to tune an FSR, and less accurate temperature control, but results in higher channel cross talk. Preferred filters are fabricated to minimize FSRs and maximize cavity lengths to facilitate the use of lower cost component filters, while maintaining a minimum level of channel cross talk. Preferred filters are also fabricated, if possible to tune over an FSR in a practical useful temperature range, preferably over 30–60° C., with a practically useful accuracy, preferably higher than 0.1° C.

The channel in the substrate is shaped and sized for closely receiving the fiber containing the FFP and accommodating epoxy layers that may be present on the fiber to bond the fiber elements of the FFP. For example, a cylindrical groove having about a 600 micron diameter extending along the length of an aluminum block will accommodate an FFP constructed by epoxy bonding of fibers of standard diameter and allow for application of a large compressive load after heat-curing of the epoxy used to bond the fiber into the groove. In general, it is preferred that the layer of epoxy used to bond the fiber to the substrate is extremely thin to minimize its contribution to the composite temperature coefficient of the filter, but to provided sufficient mechanical strength to retain the bond between the fiber and the substrate during repeated cycles of temperature tuning.

FIG. 2 illustrates an all fiber temperature tunable component FFP filter (10) of this invention comprising a fiber (5) containing a nominally fixed FP cavity 6 between two fiber embedded mirrors (7 and 8) which is bonded using a thin layer of epoxy (11) into a groove (12) in an aluminum substrate (15). The substrate is in turn mounted on a thermal electric heater/cooler 20 (which are commercially-available). Power and suitable temperature regulation is provided to the heater/cooler (schematically illustrated (25)). Appropriate temperature insulation (30) is provided.

Figure 3:
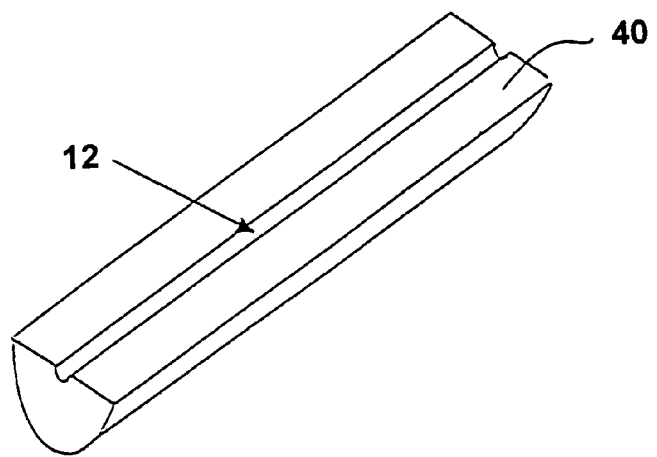
FIG. 3 illustrates a grooved substrate for use in a thermally tunable FFPI.

FIG. 3 illustrates an inexpensive grooved substrate for use in component filters of this invention. The illustrated substrate is a grooved aluminum block ((40) where element (12) is the groove), having a 0.005 in diameter groove for receiving a fiber. This substrate is formed as a u-shaped tube by sawing a notch into a round aluminum (or other appropriate substrate material) tube along the length of the round tube using a saw blade of thickness approximately equal to the tube inner diameter. Exemplary dimensions of the aluminum block shown in FIG. 3 are a 0.05 in diameter aluminum block, so that the corresponding height of the aluminum block is 0.025 in, and a block length of 0.5 in.

The thermal expansion coefficient of fused silica fiber itself can only result in wavelength tuning of ~10 pm/° C., i.e. it can only tune over 1 nm with 100° C. temperature change. For bonded FFPIs, the minimum cavity length is around 0.5 mm, determined by the size of epoxy at the bonding joints, this limits the maximum FSR to be ~2 nm. With 10 pm/° C. thermal-optical coefficient, it is practically impossible to tune over one FSR. To increase the thermal-optical coefficient, heat-cured epoxy and a metal channel holder are utilized as shown in FIG. 4. In this case, the thermal-optical coefficient is not only determined by the fiber (5) itself, rather it is determined by the composite (fiber (5)), bonding agent ((23), epoxy)and substrate (15)). If the influence of epoxy at the bonding joints is small enough and an aluminum holder (15) is used, the composite thermal optical coefficient can be calculated by the following equation:

$$\Delta\lambda = \lambda \cdot \left(0.79 \cdot \left(\frac{\Delta l}{l}\right) + \left(\frac{\Delta n}{n}\right)_T\right) =$$

$$1.55 \cdot (0.79 \times 23.45 + 5.75) \cdot \text{pm}/°\text{C.} = 37.6 \text{ pm}/°\text{C., where}$$

-continued $$\frac{\Delta l}{l} = \left(\frac{\Delta l}{l}\right)_{Al} - \left(\frac{\Delta l}{l}\right)_{fiber} =$$
$$24 \times 10^{-6} /°C. - 0.55 \times 10^{-6} /°C. = 23.45 \times 10^{-6} /°C.$$

The factor of 0.79 can be derived by the measurement result that 1 μstrain causes 1.22 pm wavelength change in fiber Bragg grating. With 37.6 pm/° C. thermal optical coefficient, it needs ~26.6° C. to tune over 1 nm. This temperature range can be readily achieved and results in a practical thermally tunable device.

There are several desired characteristics of the specific design illustrated in FIG. 4: (1) wavelength tuning range is enlarged by use of an aluminum holder; (2) the fact that expansion of aluminum and glass induced by temperature change have little historesis allows passive wavelength calibration using temperature; (3) because epoxy cures at higher temperature (>100° C.) than the filter operating temperature (<80° C.), the cavity is always under compression during operation, thus the device is reliable; (4) it is a low cost design. The fiber 5 can be embedded within a channel 61 containing a groove 12 in an aluminum substrate 15. A portion of the fiber can be coated 60. The fiber has bare fiber 62 and coated (also called "buffered") fiber 64 sections. Heat cure epoxy 23 and epoxy joint 63 can assist in placement of the fiber 5 and fiber embedded mirror 7.

Figure 6:
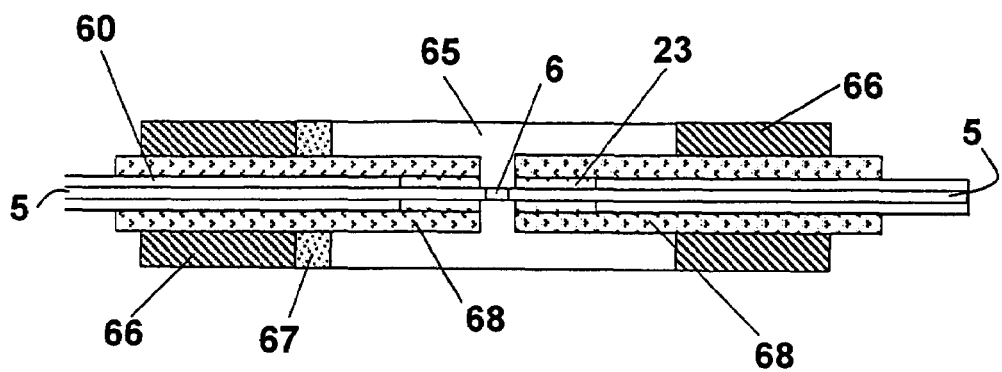
FIG. 6 illustrates another electromechanically tunable FFPI.

Exemplary electromechanical tunable FFPI are illustrated in FIGS. 5 and 6. It was measured that ~100 Lb is need to tune one FSR for an FFPI with 1 mm long cavity in Pyrex ferrules with 2.5 mm OD. Using these measurements, it is calculated that ~0.25 Lb is needed to tune one FSR for an FFPI with 1 mm long cavity in bare fiber structure since the end surface of a bare fiber is 400 times small than that of a ferrule. Therefore, the bare fiber structure of the FFPI of this invention makes compression tuning using small PZT practical.

The term "bare fiber" is used herein to refer to a portion of optical fiber that is uncoated and that is not confined within a fiber ferrule. It is known in the art to form Fabry-Perot cavities in fibers that have been inserted into fiber ferrules by formation of fiber ferrule assemblies, see, for example, U.S. Pat. Nos. 5,212,745, 5,289,552 and 5,212,746. Fabry-Perot cavities of this invention formed in bare fiber are not formed within ferrule assemblies.

In FIG. 5A, shown in longitudinal cross-section, end brackets (51) are designed for attachment to a PZT (55). These brackets are preferably made of aluminum. A substrate channel is bonded to each end bracket with a layer of epoxy (23) such that there is a gap between the two substrates (59). The FFPI, in this case, a bare section of fiber containing the F-P cavity flanked by coated fiber regions (60), is bonded across the two substrate channels. The two substrate channels are made of low expansion coefficient metal, e.g., Kovar™). The fiber cavity (6) extends across the gap between the substrates. A change in length of the PZT in this configuration is conveyed to the substrates and the length of the fiber cavity is changed. Compression on the bare fiber cavity (6) in this configuration can be achieved by applying positive voltage (~60V) to PZT when bonding the fiber across the substrates.

FIG. 5B provides an axial cross-section of the FFPI of FIG. 5A.

Another electromechanical tuning configuration is illustrated in a cross-sectional view in FIG. 6. In this configuration a cylindrical PZT (65), which has a cylindrical hole along its longitudinal axis, is employed. Ferrule holders (66) (also cylindrical with an axial hole or bore for receiving a ferrule) are bonded on ends of the PZT. A washer 67 for thermal compensation can be placed between a ferrule holder 66 and the PZT 65. A fiber (5) carrying a bare fiber section containing an FFP cavity (6) bounded by two fiber sections held within the axial bores of fiber ferrules (68) (with epoxy 23). In one embodiment, ferrule 68 is made from pyrex. The ferrule/fiber combination is inserted into the axial bore of the PZT/ferrule holder combination such that the ferrules (68) are in contact with ferrule holders (66) and the bare fiber region not within the ferrules and which contains the FEP cavity is within the axial cavity of the PZT. The bore of the ferrule holders and the PZT are sized and shaped to receive the fiber ferrules. Each ferrule is held within a holder, for example using one or more set screws (not shown) extending into the bore to tighten against the ferrule. In this configuration, compression is achieved by applying positive voltage (~60 V) to the PZT when tightening the setscrews in the end bracket. For both structures, the voltage required to tune over one FSR, which correspond to ~0.39 μm in length change, is ~10 to 14 V.

PZT tuned FFPIs are provided with appropriate electronic circuitry for application of voltage to the PZT for tuning. Various methods are available in the art for application of a locking circuit to the device to maintaining tuning at a desired wavelength. Similar wavelength locking electronic can be provided for thermally tuned devices.

PZT compression tuned filters can be rapidly scanning over a desired wavelength range and/or rapidly locked to a desired wavelength. Optical characteristics of the filter, such as reflection contrast, can be adjusted by set screws (not shown) holding the ferrules in the device of FIG. 6.

Figure 7:
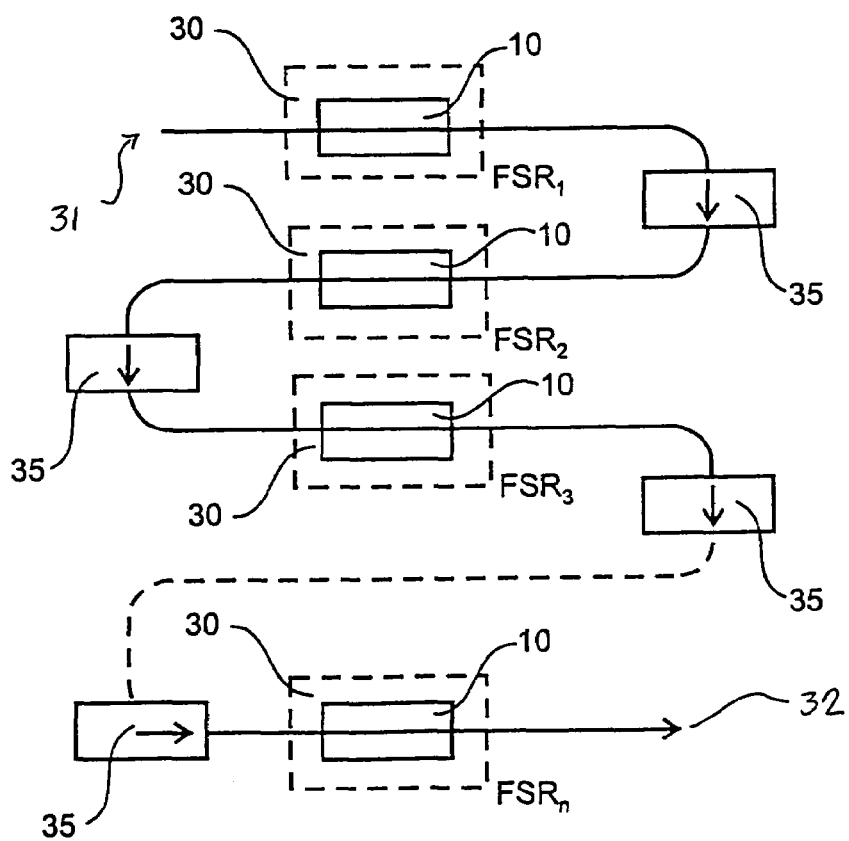
FIG. 7 illustrates a cascaded filter configuration.

FIG. 7 illustrates a configuration of a cascaded filter of this invention combining two or more component FFP filters of FIGS. 2–6. The cascade is illustrated for N component filters. Filters with two, three or four stages will more typically be employed. The component filters (10) are optically coupled in series using appropriate fiber connections with light transmission from input (31) to output (32) as illustrated. Component filters are isolated from each other using appropriate isolators (as illustrated) (35). Standard isolators can be employed. Alternatively, the isolators can be replaced with lengths of fiber that are of sufficient length to provide required isolation. FSRs of the component filters of the cascade are selected to achieve the vernier effect as described above.

During fabrication of FP cavities in optical fibers, accurate optical alignment is achieved using a fiber alignment stage which is adjustable along three axes, and preferably along six axes, as described for example in U.S. Pat. No. 6,241,397. Alignment stages that can be employed in this invention are commercially available from Melles Girot, Boulder, Colo.

Those of ordinary skill in the art will appreciate that materials, device elements, procedures, and applications other than those specifically named herein can be applied to the practice of the invention as described herein without resort to undue experimentation. The cascaded filters herein can, for example, be constructed, using alternate materials and methods that would be understood to be functionally equivalent to the materials and methods specifically named herein. The description herein has exemplified FFPI having a single Fabry-Perot cavity formed between two embedded mirrors or reflective surfaces. It will be understood in the art that compound optical cavities or multiple Fabry-Perot cavities can be formed in a single length of fiber and that such fiber cavities can be employed for tunable filters of this invention. The cascaded filters herein can be applied or readily adapted in optical applications other than those specifically named and employed in spectral regions other than those specifically named herein in view of the descriptions herein and what is known in the art. The cascaded filters herein can be combined with or readily adapted for use with known optical device elements (e.g., optical couplers, isolators, amplifiers, other tunable or fixed optical filters) to provide useful optical device configurations. All materials, procedures, and applications known or understood in the art to be functional equivalents of materials, procedures and applications specifically named herein are intended to be encompassed by this invention.

All references cited herein are incorporated by reference herein to the extent that they are not inconsistent with the disclosure herein. References cited herein are incorporated in particular to provide methods for fiber splicing and/or fusion, methods and techniques for temperature tuning of FFPs, and for general instructions for selection of component filters to form vernier configurations of filters.

We claim:

1. A cascaded tunable filter which comprises two or more tunable all-fiber Fabry-Perot component filters optically coupled in sequence wherein the FSRS of the Fabry-Perot component filters are selected to achieve a vernier configuration of filters, wherein the two portion of the fiber of each component filter are held within a fiber ferrule and the Fabry-Perot cavity of each filter is formed in bare fiber between the ferrules.

2. The cascaded tunable filter of claim 1 wherein the component filters are temperature tunable.

3. The cascaded tunable filter of claim 1 wherein the component filters are electromechanically tunable.

4. The cascaded tunable filters of claim 1 wherein the component filters are compression tunable.

5. The cascaded tunable filter of claim 1 having two component filters.

6. The cascaded tunable filter of claim 1 having more than two component filters.

7. The cascaded tunable filter of claim 1 wherein the Fabry-Perot cavities of the component filters are formed by bonding of fiber ends one of which carries a reflector to form a fiber embedded reflector.

8. The cascaded tunable filter of claim 1 wherein the fiber ferrules holding the fiber carrying the Fabry-Perot cavity are held within ferrule holders and wherein the distance between the ferrule holders can be changed to change the cavity length and tune the filter.

9. The cascaded tunable filter of claim 1 wherein the component filters comprise a Fabry-Perot cavity formed in a bare section of fiber and the fiber of the filter is bonded to a metal substrate.

10. The cascaded tunable filter of claim 9 wherein the metal is aluminum.

11. The cascaded tunable filter of claim 1 wherein vernier multipliers are employed to achieve the vernier configuration and the vernier multipliers are the reciprocals of a series of consecutive integers which are not multiples of each other.

12. The cascaded tunable filter of claim 11 wherein the vernier multipliers are selected from the series $1/11, 1/12, 1/13, 1/14, 1/15, 1/16, 1/17, 1/18, 1/19$ and $1/20$.

13. The cascaded tunable filter of claim 11 wherein the vernier multipliers are selected from the series $1/20, 1/21, 1/22, 1/23, 1/24, 1/25, 1/26, 1/27, 1/28, 1/29$ and $1/30$.

14. A method for generating a selected wavelength spectrum employing a cascaded tunable filter of claim 1 wherein tuning is performed by coordinated tuning of the component filters.

15. An all-fiber Fabry-Perot interferometer wherein the Fabry-Perot cavity is formed in bare fiber and wherein the length of the Fabry-Perot cavity is changed thermally or electromechanically to tune the wavelengths transmitted by the interferometer, wherein the fiber containing the Fabry-Perot cavity is bonded into a groove of a metal substrate.

16. The interferometer of claim 15 which is tuned thermally by changing the temperature of the metal substrate.

17. The interferometer of claim 15 wherein the fiber containing the Fabry-Perot cavity is bonded to two metal substrates such that the Fabry-Perot cavity of the fiber bridges a gap between the two substrates.

18. The interferometer of claim 17 which is tuned by changing the length of the gap between the metal substrates.

19. The interferometer of claim 18 further comprising a piezoelectric element attached to both substrates wherein the gap between the substrates is changed by application of a voltage to the piezoelectric transducer.

20. The interferometer of claim 15 which is tuned by compression of the fiber.

* * * * *